Figure 4:
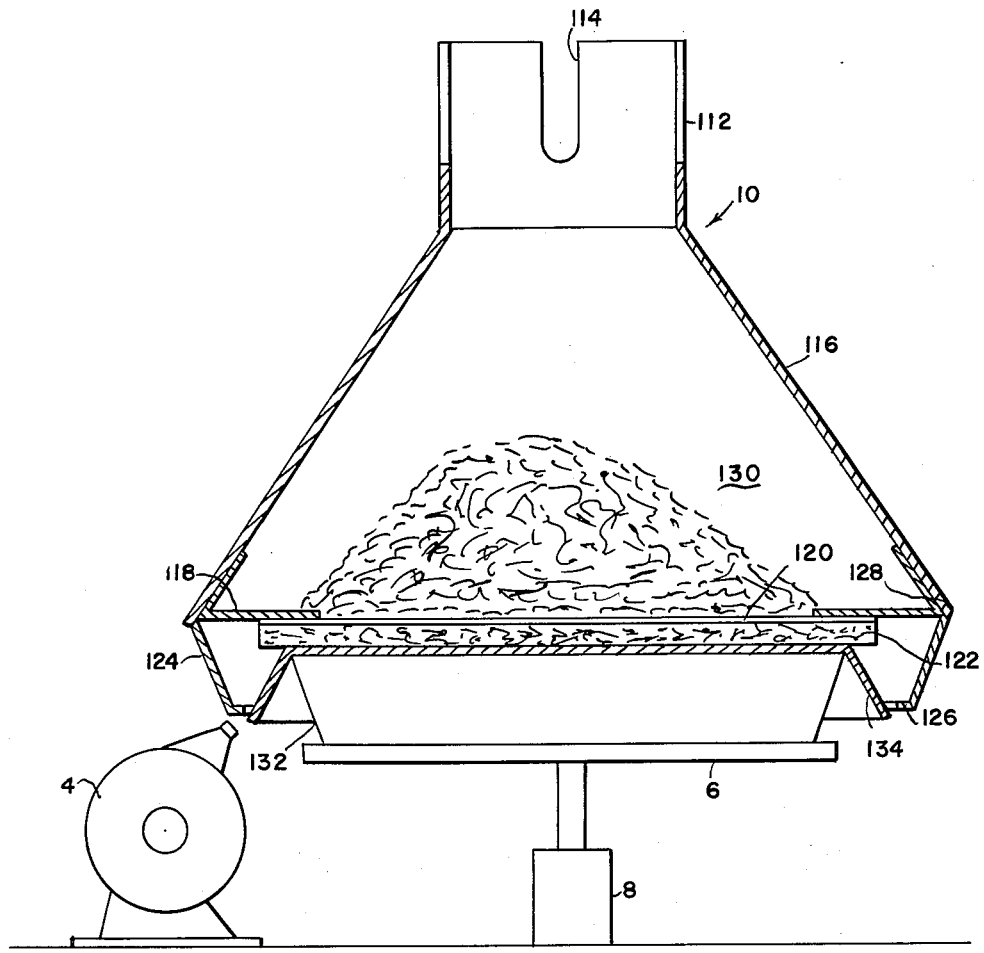

March 28, 1961 R. L. DREYFUS ET AL 2,976,655
PACKAGING METHOD AND APPARATUS
Filed Aug. 20, 1959 5 Sheets-Sheet 1
FIG.1.
FIG.5.
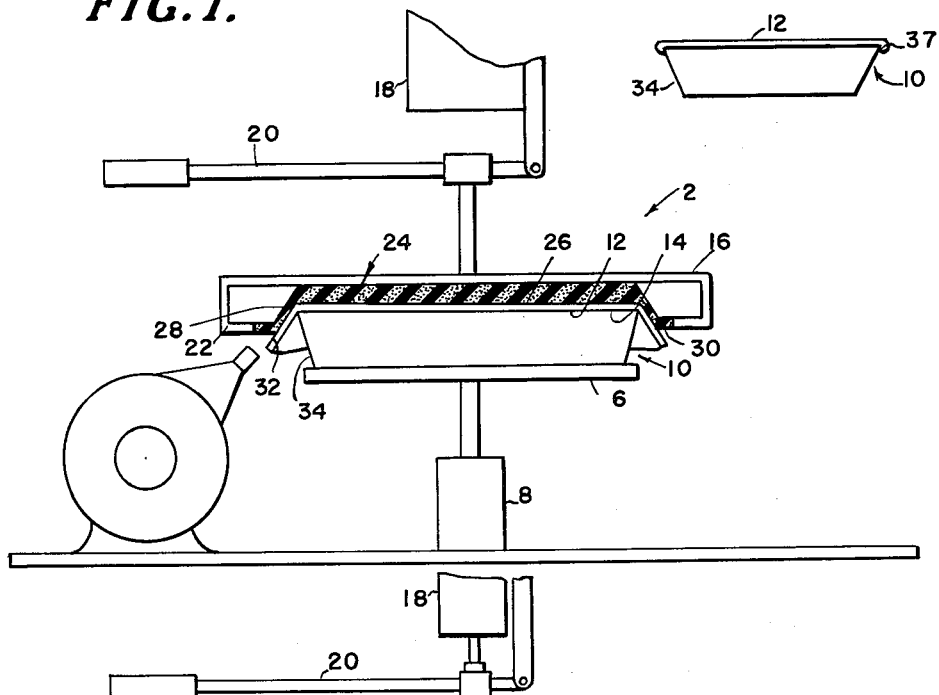
FIG.2.
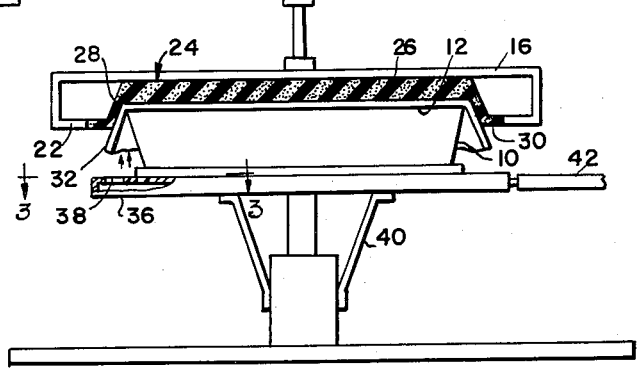
FIG.3.
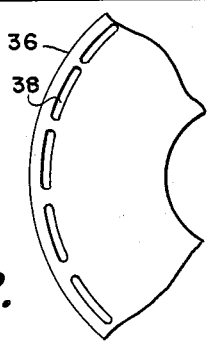
INVENTORS
ROBERT L. DREYFUS
JOHN W. HARRISON
BY Cushman, Darby & Cushman
ATTORNEYS March 28, 1961 R. L. DREYFUS ET AL 2,976,655
PACKAGING METHOD AND APPARATUS
Filed Aug. 20, 1959 5 Sheets-Sheet 3

INVENTORS
ROBERT L. DREYFUS
JOHN W. HARRISON

BY Cushman, Darby & Cushman
ATTORNEYS

March 28, 1961 R. L. DREYFUS ET AL 2,976,655
PACKAGING METHOD AND APPARATUS
Filed Aug. 20, 1959 5 Sheets-Sheet 4

INVENTORS
ROBERT L. DREYFUS
JOHN W. HARRISON
BY Cushman, Darby & Cushman
ATTORNEYS March 28, 1961 R. L. DREYFUS ET AL 2,976,655
PACKAGING METHOD AND APPARATUS
Filed Aug. 20, 1959 5 Sheets-Sheet 5

INVENTORS
ROBERT L. DREYFUS
JOHN W. HARRISON

BY Cushman, Darby & Cushman
ATTORNEYS

United States Patent Office 2,976,655
Patented Mar. 28, 1961

2,976,655
PACKAGING METHOD AND APPARATUS
Robert L. Dreyfus, Arlington, and John W. Harrison, Winchester, Mass., assignors to W. R. Grace & Co., Cambridge, Mass., a corporation of Connecticut
Filed Aug. 20, 1959, Ser. No. 835,060
7 Claims. (Cl. 53—42)

The instant application is a continuation-in-part of application Serial No. 772,471, filed November 7, 1958.

This invention relates to novel methods and apparatus for shrinking biaxially oriented polymers and to containers prepared by the use of such methods and apparatus.

It is an object of the present invention to provide a method for applying a protective cover over the open side of a container.

Another object is to provide an apparatus suitable for forming a shrinkable polymer film into a cover for a container, folding the edges against the sides of the container and shrinking portions of the polymer film to form the cover.

A further object is to form an elastic edged cover for dishes and the like, said cover being thickened in the edge portion.

An additional object is to provide a cover from a plastic film which will have a tab to assist in removing the cover.

Yet another object is to improve the bond of shrinkable irradiated polyethylene covers to containers made of glass, paper or thermosetting plastic.

A still further object is to produce an elastic edge on covers for food containers, bottles and the like.

An additional object is to produce caps or covers having a shirred edge and useful as covers for refrigerator dishes and jars, bathing caps, etc., in a completely automatic manner; to avoid the necessity for employing elastic bands or tape; to make an entirely unitary cap; to give elastic properties to the margin of the cap, and to supply film covers for dish or tray-packed foodstuffs which may be placed on the container by the packer, but removed by the housewife and reused as a cover for the particular container so long as any foodstuff remains.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are attained in the manner subsequently described utilizing heat shrinkable oriented polymers including heat shrinkable irradiated polyolefins, more particularly, heat shrinkable, irradiated, biaxially oriented polyethylene and heat shrinkable, irradiated, biaxially oriented polypropylene. While irradiated, biaxially oriented polyethylene is preferred, other commercially available heat shrinkable materials include biaxially oriented saran (a vinylidene chloride polymer), biaxially oriented rubber hydrochloride, biaxially oriented polyethylene terephthalate (Mylar), biaxially oriented nylon film and biaxially oriented polystyrene.

Figure 6:
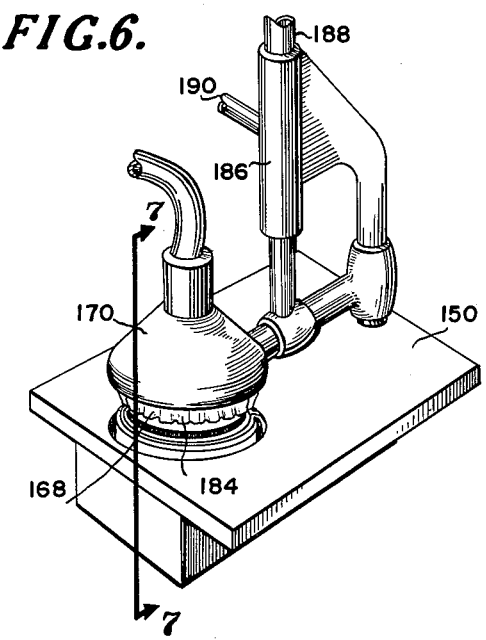
Figure 7:
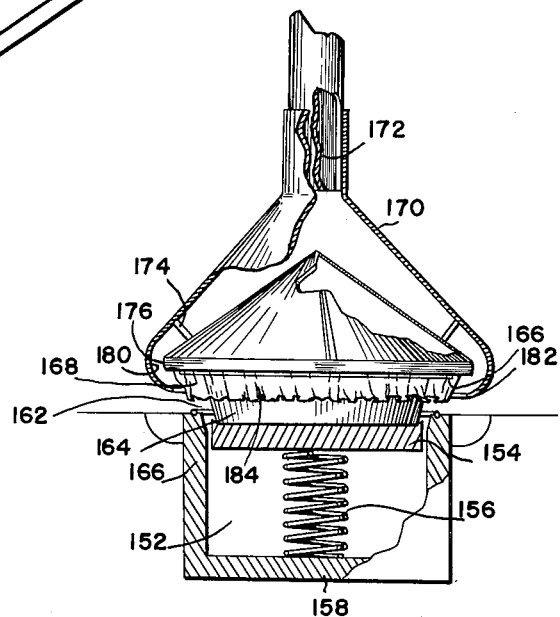
Figure 8:
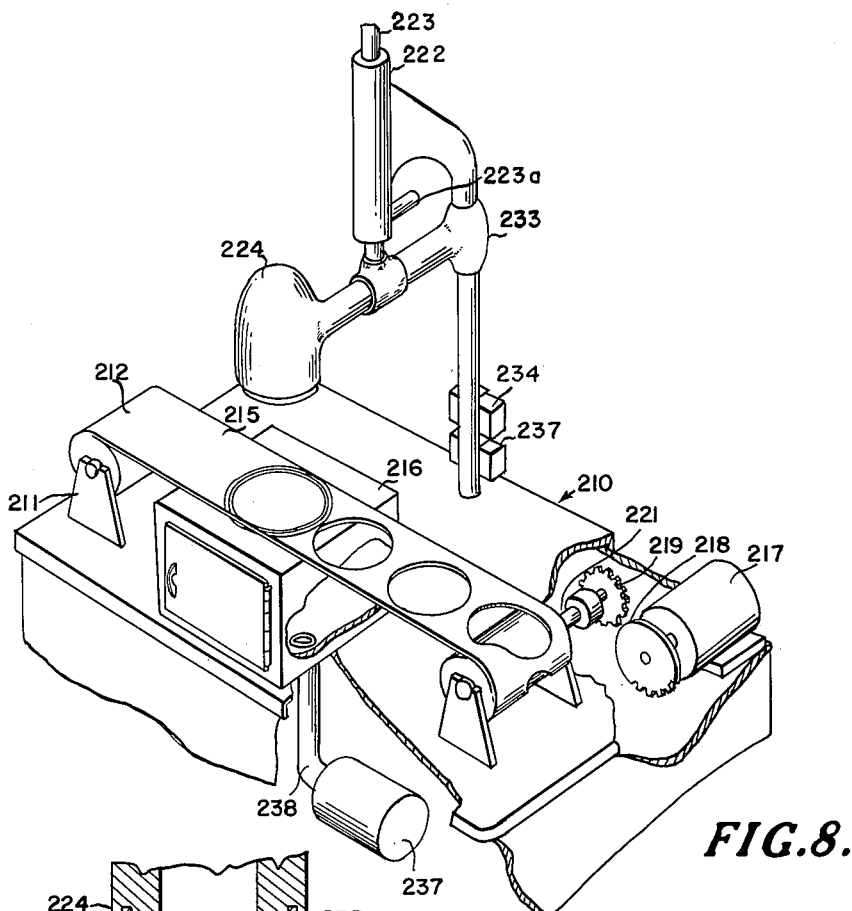
Figure 9:
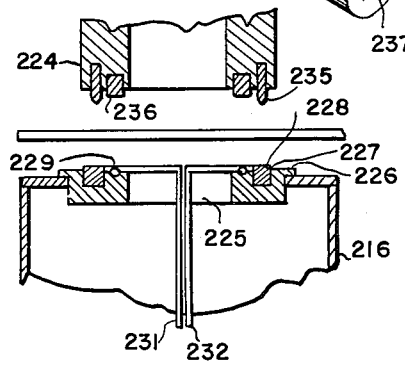
Figure 12:
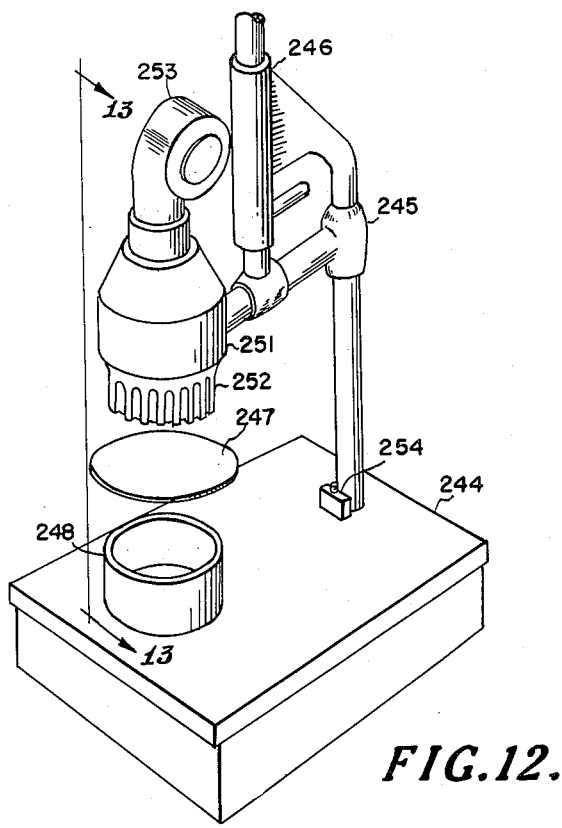
Figure 13:
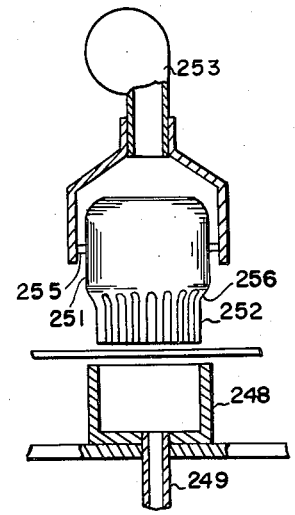
Figure 10:
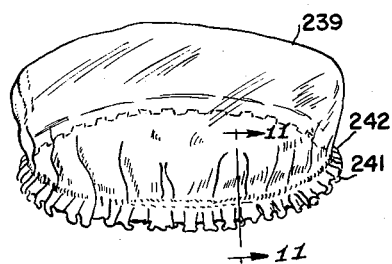
Figure 11:
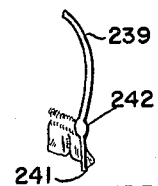

Referring to the drawings:
Figure 1 is a side elevation of an apparatus for heat shrinking a cover on a container;
Figure 2 is a side elevation of an alternative device for heat shrinking a cover on a container;
Figure 3 is a sectional view taken along the line 3—3 of Figure 2;
Figure 4 is a side elevation of another device suitable for heat shrinking a cover on a container;
Figure 5 is a vertical section of a container having a heat shrunk cover thereon;
Figure 6 is a perspective view of a machine for imparting a controlled elastic edge to a cap;
Figure 7 is a sectional view along the line 7—7 of Figure 6;
Figure 8 is a perspective of a machine for manufacturing shirred edge caps automatically;
Figure 9 is a cross section of a portion of the machine on the line 9—9 of Figure 8;
Figure 10 illustrates a jar cover made on the machine of Figure 8;
Figure 11 is an enlarged cross section of the cover taken on the line 11—11 of Figure 10;
Figure 12 illustrates in perspective a machine which is used when it is desired to have the entire margin of the cap elastic; and
Figure 13 is a cross section of the machine taken on the line 13—13 of Figure 12.

In the specific examples below there was employed heat shrinkable irradiated, biaxially oriented polyethylene, specifically Alathon 14, molecular weight of 20,000 and density of 0.916, which had been irradiated to an extent of about 12 megarad and then biaxially stretched 350% longitudinally and 350% laterally. The irradiated polyethylene had a shrink energy of about 150 p.s.i. in both directions.

Referring more specifically to Figure 1 of the drawings, there is provided an apparatus 2 for selectively shrinking irradiated polyethylene film to provide an elastic edged cover for dishes. In providing such covers there is the problem of holding the cover film in place and folding the edges down evenly against the sides of the container and then shrinking them in that position. To even out any wrinkles, the cover film can be finally heated slightly, if desired. The apparatus of Figures 1 and 2 are eminently suited to solve the problem outlined above.

The apparatus 2 comprises a hot air blower 4 and a turntable 6 mounted for rotation on support 8. A truncated conical container 10, e.g., a wax coated paper container filled with cheese, is positioned on the turntable and an approximately circular film 12 of the irradiated biaxially oriented polyethylene of somewhat larger diameter than the open end 14 of the container was positioned over the opening.

Above the turntable 6 is positioned a diaphragm holder 16 of larger diameter than the container. The diaphragm holder is mounted for rotation concentrically with turntable 6 on support 18.

The diaphragm holder also is connected to lever 20 which can raise or lower the diaphragm holder to the idle or working condition as is required. The diaphragm holder is cylindrical and has an inner flange 22 at its lower end. Secured to the diaphragm holder is a diaphragm or sponge pad 24. The diaphragm has a flat horizontal upper section 26, a middle section 28 extending outwardly and downwardly and of a conical shape and an outwardly extending lower portion 30 which is connected to the inner flange 22.

In operating according to the invention the container 10 is positioned on the turnable 6. The film 12 of irradiated biaxially oriented polyethylene from 0.5 to 5 mils, e.g., of 3 mil thickness, is positioned over the top of the container. The lever 20 is then lowered until the upper portion 26 of diaphragm 24 engages the film. The diaphragm not only holds the film in place but it also evenly bends down the overlying edges 32 of the film. The hot air blower is then started as is the turntable. The hot air forces the film in place against the sides 34 of the container while at the same time the hot air also shrinks the film. As a result the film forms a thickened edge or bead 37 as shown in Figure 5 around the lip of the container. This thickened edge is usually about 5 to 10 times as thick as the film itself. As a result, an elastic edged cover for the container is formed. The cover can be removed to open the container and then can be applied again as a cover for the container due to its elasticity.

In order to even out any wrinkles formed in the cover film, it can be heated slightly while on the turntable.

The use of the turntable insures that the cover is evenly heated and consequently that there will be uniform shrinkage to form a smooth and attractive sealing edge on the film.

In Figure 4 there is shown a special nozzle 110 which has been successfully employed for sealing the irradiated biaxially oriented polyethylene over the top of pie plates, cheese tubs, glasses, cups and the like. The nozzle of Figure 4 can be used with any commercially available hot air source. The nozzle 110 comprises a cylindrical neck 112 which can be split as at 114 to pinchfit a flameless blow torch. The neck 112 ends in a metal cone 116. At the lower end of the cone there are four narrow supports 118 for metal disc 120. Adhered to the metal disc 120 is a soft silicone or other heat resistant sponge 122. The sponge preferably has a 30 durometer hardness and is a polydimethylsiloxane, although other silicone sponges can be employed. A metal inverted truncated cone 124 terminating in an inner flange 126 also depends from the lower end 128 of the cone 116. Above the metal disc 120 there is provided a foamglass insulator 130 to protect against undesired heating of the container 132 to which is applied to irradiated biaxially oriented polyethylene film 134. The container 132 is supported on stand 136. The film is shaped to the desired cover contour as described in connection with Figure 1. Heating is accomplished, however, by the hot air which passes through the nozzle and emerges at the lower end 128 of the cone along the periphery thereof and thence to inverted cone 124 where it contacts the formed cover and shrink seals it to the container. This unit has been employed satisfactorily at a gas temperature of 500° F. although other temperatures can be employed so long as they are high enough to shrink the polyethylene.

In place of the turntable and single position blower there can be used other devices to insure uniform heating. For example, as shown in Figures 2 and 3, the blower and turntable can be supplanted by an annular ring 36 supported on frame 40 and having a series of openings 38 placed to direct heated air introduced via line 42 upward to be reflected from the diaphragm in a manner to push the film against the container sides while shrinking the edges to form the finished cover shown in Figure 5. It will be appreciated that instead of heated air there could be employed steam, hot water or other heated fluid.

The diaphragm and associated heating apparatus can be placed on a conveyor to either travel with the product during the application of heat or to have the conveyor index under a fixed application point.

In a continuous process, for example, a dispensing device can be provided over the conveyor in advance of the unit to place a circular disc or square of film over each container as it passes under the dispenser. A small traveling band of tape or an air curtain can be used to hold the film in place as the conveyor travels ahead. After shrinking the film to form the bead, either hot air from the annular ring (or rectangle) as it rises from contact or from a separate hot air blower can be used to eliminate any wrinkles from the surface of the package. While the film which forms the thickened edge is substantially completely shrunk, there is virtually no shrinkage of the protective film over the opening 14 of the container.

The process can be carried out utilizing a substantially inverted apparatus wherein hot air from orifices in a table top below the film upward and inward to effect the seal. Alternatively, the film and inverted dish can be placed on a depressible pad and pushed downward into a chamber of heated fluid which would float the film upward and inward. In this procedure preferably the immersion is controlled so as not to let the heated liquid flow over the edge of the film until shrinkage is accomplished.

The film cover pressure pad 24 can be applied to the film in a chamber which has been filled with an inert gas, e.g. helium, argon or nitrogen, or in a vacuum chamber. Shrinking and sealing can then be accomplished to maintain this controlled atmosphere within the container being sealed.

When a square of film is positioned on a round container opening the subsequent shrinking provides small, unobtrusive tabs which aid in removing or reapplying the cap.

The cap or cover has been found to seal tightly by its own tension in most cases. An especially good bond can be obtained by coating the outside of the container in the sealing area with wax or with other thermoplastic material.

The apparatus shown in Figures 1–4 is particularly useful in preparing closures, e.g. milk bottle hoods, covers for pie plates, trays, meat pie plates, TV dinner trays, jars, cans or jelly tumblers, particularly those having a flared or lip-type top edge. It is likewise useful in covering containers for ice cream, potato salad, cottage cheese or other foods in plastic or coated paper or metal e.g., aluminum, containers.

In those cases where less heat is desirable or it is desirable to produce a product having an elastic edge having less tension there can be employed the apparatus of Figures 6 and 7. This machine comprises a base 150 having a cutout or recess 152 therein. A platform 154 is mounted on spring 156 in the recess and the spring is also attached to the bottom 158 defining the recess. Thus the platform 154 is movable in a vertical direction. Around the top 160 of the recess defining structure there is provided an impulse sealing wire 162 attached to a source of electricity (not shown).

A frusto-conical aluminum dish 164 having a peripheral flange 166 is positioned on platform 154 and a disc 168 of irradiated biaxially oriented polyethylene film is placed over the top of the dish. The disc 168 is of larger diameter than the top of the dish 164 including flange 166. Additionally there is provided a cone 170 having an air passageway 172 and connected to a source of compressed air (not shown). The cone 170 is positioned over and around the top of the dish 164. At the lower end of the cone are supports 174 for a sponge 176, e.g. of polydimethylsiloxane. Since the sponge extends beyond the outer diameter of the dish 164 and flange 166, it holds the disc 168 in place thereover. Then air is supplied through passageway 172. An inner cone is mounted above sponge 176 so that the air as it comes out of passageway 172 is forced around the inner periphery 180 of the cone 170. At its lower terminus cone 170 is bent inwardly as at 182. Consequently the air introduced into cone 170 is blowing downwardly and inwardly and the film 168 is wrapped downwardly to form a wrinkled skirt 184.

The diameter of the disc 168 is preferably sufficiently large that after cone 170 is positioned thereover it extends below the lower terminus of the cone. Cone 170 is lowered and raised with the aid of a pneumatic valve (not shown) which admits air to air cylinder 186 through conduit 188 and exhaust air through conduit 190. Raising and lowering of the cone is accomplished in the manner described in further detail in connection with raising and lowering of head 224 in Figures 8 and 9.

After the downwardly blowing air has formed the shirred skirt 184 then the cone is lowered further so that the lip or flange 166 of the container rests on the circular impulse sealing ring 162, about ⅛ inch from the edge all around with the gathered film between the wire and the lip of the dish. The sponge applies slight downward pressure on top of the dish to maintain intimate contact all around. The impulse sealer is then operated, i.e. by heating, for 1¼ seconds at 450° F., to seal the wrinkles and shrink the film generally to provide a gathered but relatively elastic edge.

In place of using the air cone described above there can be employed an iris which starts above the dish 164 and has a larger outer diameter. In such case the iris is dropped down over the dish and then is closed inwardly to gather the film.

Also the impulse sealer can be in the form of a ring rising from below the dish or it can be segmented and close in from the sides. In such case preferably the ends are overlapping.

The sealing can be either to the under side of the lip or against the side wall of the container as desired by controlling the lowering of the dish or by the selection of an appropriate dish diameter in relation to the inner diameter of recess.

The covers formed according to the invention as illustrated in Figures 6 and 7 are quite elastic and so can be used as covers for re-use of the container or of other similar containers.

In another aspect of the present invention as illustrated in Figures 8–13 there are provided elastic margin film caps which can be used as dust covers for laboratory glassware, covers for refrigerator dishes and jars, bathing caps and many other uses. It has been discovered that if a film having high shrink energy is restrained and heat is applied to the margin or along a narrow line adjacent to the margin, and if, after heating the restraint on the film is immediately released, the effect on the film is similar to that of sewing an elastic thread under tension onto a fabric or film. The line along which the heat was applied thickens materially as the material is drawn into the shrunk area, becoming, in many instances as much as 10 times as thick as the remaining areas of the film. It is a special feature of this form of the invention that the heated line, which in this instance is adjacent to the periphery of the cap, becomes what is an essentially permanent, rubber-like elastic area capable of stretching and retracting repeatedly. The relaxed perimeter of this heated area is much less than the original dimension. Consequently, the unheated panel area inside the heated peripheral zone is puckered into a cap shape. This change in what was essentially a film having very limited elastic properties is a characteristic of this phase of the invention. Among available oriented, heat shrinkable materials which have the requisite physical properties are oriented saran, oriented rubber hydrochloride and oriented polyethylene terephthalate. The orientation is generally biaxial. The film must have a high shrink energy and must be able to shrink at least 20% in each direction at 96° C.

The heated area becomes permanently elastic. After stretching, it may take a small degree of permanent set (about 10%) but thereafter it stabilizes and will withstand repeated stretching without undergoing any substantial change in dimension.

The term "elastic" is used in its popular sense as possessing the properties of extensibility and retractibility associated with vulcanized rubber.

Referring to Figure 8, the machine comprises a base 210 on which is mounted a support 211 for the supply roll 212. A companion support 213 for the waste take-up roll 214 is mounted on the opposite end. Film 215 which unwinds from supply roll 212 is carried across the top of a small vacuum chest 216. Drive for the machine is secured by motor 217 through intermittent gearing diagrammatically indicated by the gears 218 and 219. When the teeth of these gears intermesh, film 215 is advanced to the next indexing position.

Whenever the shaft 221 of the waste take-up roll comes to rest, a small microswitch (not shown) energizes a double-acting electro pneumatic valve (not shown) which admits air to the air cylinder 222 through the conduits 223, and exhausts air beneath the piston through conduit 223a. Pressure head 224 is thus forced into contact with the film.

Referring to Figure 9, it will be seen that the vacuum chest 216 carries a large orifice 225 which faces upwardly. A portion of this orifice is occupied by a ring 226 of heat-resistant material such as asbestos-cement insulating board. Ring 226 carries a channel 227 in which is placed a knife-bedding ring 228 of some relatively soft substance preferably heat-resistant rubber. Immediately inside the ring 228, a ring of resistance wire is fastened to the heat-resistant asbestos-cement ring 226. When the head 224 is lowered by the piston, bracket 233 comes into contact with microswitch 234 and energizes the resistance wire of ring 229 through the electrical conductors 231 and 232. Meanwhile, the knife 235 which is fitted into the end of the head 224 has severed a disk from the film 215 and film 215 is also pushed into firm contact with the resistance wire by means of a ring 236 of compressible heat-resistant rubber. Restraint at the moment of heating is thus secured. A controlled amount of heat only should act on each disk of film material. Consequently, resistance wire 229 after its original energization is almost immediately timed out by the action of the timing device. Time-out varies according to the thickness and nature of the film, but as an example, if the film be 1 mil thick irradiated polyethylene and the diameter of the ring of resistance wire be approximately 3¼ inches, time-out should occur after approximately 120 watt seconds have been released by the resistance wire.

As soon as gear 219 begins its movement again, air pressure in cylinder 222 is reversed and head 224 rises. Quite a small fan 237 or some other vacuum-producing device is connected to the chamber 216 through the conduit 238 to create a small pressure differential between the atmosphere and that within the chamber. As the head 224 rises and releases the film, this pressure differential pushes the newly formed cap into the vacuum chamber. Successive caps collect in it and may be removed periodically.

The caps which are formed are shown in Figure 10. It will be noticed that the cap 239 is characterized by a shirred margin 241 and by a much thicker ring 242 of the same material as the cap. As has been stated, ring 242 is permanently elastic and behaves like an elastic band. The cap can, consequently, be snapped over a bowl or a jar mouth and is effective to prevent dessication in refrigerators or prevent foreign material from falling into an opened jar.

Sometimes, as in the case of throw-away bathing caps, it is desirable to have the elastic portion of the cap wider and stronger than that shown in the cap of Figure 10. For making bathing caps and the like, an apparatus is shown in Figure 12. Support arm 243 rises from work table 244 and holds and guides a reciprocating arm 245. Supply and release of air in cylinder 246 which controls the reciprocation of arm 245 is by means of a foot valve (not shown). The operator places a disk of film 247 over the cup 248 which may be of any convenient size. Cup 248 is connected through conduit 249 to a source of reduced atmospheric pressure. The operator then lowers the head 251. As the fluted portion of the head 251, which forms the die punch 252, moves into the cup, it gathers the film about itself in deep regular folds. At the same time, the reduced pressure inside the cup 248 aids in the proper distribution of the film. Flared portion 256 restrains the film by pinching it against the inner margin of the cup. Hot air blower 253 is energized when bracket 245 strikes microswitch 254 and projects hot air through the circumferential passageway 255. Consequently all of the projecting margin, which is exposed beyond the flutes, is subjected to heating. The air temperature should be appropriate to the film used. As an example, the time of heating of a 1 mil film of irradiated polyethylene when the air reaching the film is between 300–400° F. is about one second. It shrinks and turns into a wide, strong elastic band. If desired, instead of removing caps individually, cup 248 may be a cylinder mounted on a receiving chest similar to that shown in Figure 8. Then the differential pressure pops the cap into the chest as soon as head 251 rises and removes the restraint on the film.

Although designed as a throw-away item, bathing caps made by this procedure are very strong, tough and elastic enough to keep the hair from getting wet. They may be used for a considerable time before being discarded.

In general, there is employed in the invention polyethylene film or tubing which has been irradiated to an extent of 2 to 100 megarad, preferably 6 to 20 megarad. The irradiation can be accomplished in conventional fashion, e.g. by the use of a high voltage resonant transformer, such as the 2,000,000 volt General Electric transformer, or similar transformers of 50,000 to 50,000,000 volts or a Van de Graaff electron generator. In addition to the use of electrons there can be employed beta rays, gamma rays, e.g. by employing cobalt 60, etc. There can be employed any of the irradiation procedures disclosed in Baird application, Serial No. 763,848, filed February 7, 1958, and Columbia Patent 8,767, issued April 22, 1959, for example. The entire disclosure of the Baird application is hereby incorporated by reference.

The biaxial orientation is normally carried out to an extent of 100 to 700% longitudinally and 100 to 900% laterally. The biaxial stretching can be carried out by blowing irradiated polyethylene tubing as disclosed in the Baird application. The irradiated biaxially oriented polyethylene prepared by such a procedure has a high shrink energy, e.g. 100 to 500 p.s.i.

There can be employed as the starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000 or, even higher.

In place of irradiated polyethylene there can be employed irradiated polypropylene.

What is claimed as new is:

1. A method of forming a cover having an elastic edge comprising positioning a film of a high shrink energy polymer over and beyond the lip of a container, maintaining pressure on the film over the container, forcing the excess film downwardly around the container to form a gathered skirt and heating a band of said skirt briefly to shrink the skirt and provide a gathered but relatively elastic edge.

2. A method according to claim 1 wherein the polymer is irradiated, biaxially oriented polyethylene.

3. A machine for forming covers made of a heat shrinkable material on a dish shaped container comprising a container support, means for maintaining a film cover on a container positioned on said support and for gathering the edge of the film extending beyond the edge of the dish into a downwardly depending skirt and impulse heat sealing positioned adjacent said support so as to heat shrink the gathered edge of said film.

4. A machine for forming covers made of a heat shrinkable material on a dish shaped container comprising a container support, means for fixing a film cover on a container positioned on said support and for gathering the edge of the film extending beyond the edge of the dish into a downwardly depending skirt, heat sealing means for heat shrinking the gathered edge of said film and means for regulating the distance between said heat sealing means and said support.

5. A machine according to claim 4 wherein said container support is mounted for movement toward and away from said heat sealing means.

6. A machine according to claim 4 wherein said film fixing and gathering means comprises a frusto cone adapted to be positioned around said container, said frusto cone including an upper gas inlet and a lower gas outlet, said outlet permitting the gas to leave said cone substantially solely around the lower periphery thereof.

7. A machine according to claim 6 including means for raising and lowering said frusto cone in relation to said heat sealing means.

References Cited in the file of this patent
UNITED STATES PATENTS

| | | |
|---|---|---|
| 2,590,379 | Cloud | Mar. 25, 1952 |
| 2,634,013 | Atwood | Apr. 7, 1953 |
| 2,712,208 | Campbell | July 5, 1955 |
| 2,811,818 | McCarty | Nov. 5, 1957 |
| 2,878,628 | Curry | Mar. 24, 1959 |
| 2,885,105 | Heyl et al. | May 5, 1959 |
| 2,932,927 | Segerstrom et al. | Apr. 19, 1960 |